(12) United States Patent
Scherrle et al.

(10) Patent No.: US 9,309,891 B2
(45) Date of Patent: Apr. 12, 2016

(54) HYDRODYNAMIC COUPLING

(75) Inventors: Jan Scherrle, Crailsheim (DE); Stefan Hutzenlaub, Crailsheim (DE); Bernhard Schust, Kressberg (DE); Harald Hoffeld, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 460 days.

(21) Appl. No.: 13/702,491

(22) PCT Filed: Jun. 1, 2011

(86) PCT No.: PCT/EP2011/002697
§ 371 (c)(1),
(2), (4) Date: Dec. 7, 2012

(87) PCT Pub. No.: WO2011/154109
PCT Pub. Date: Dec. 15, 2011

(65) Prior Publication Data
US 2013/0086896 A1    Apr. 11, 2013

(30) Foreign Application Priority Data

Jun. 7, 2010  (DE) .......................... 10 2010 022 848

(51) Int. Cl.
*F16D 33/06* (2006.01)
*F04D 3/00* (2006.01)
(Continued)

(52) U.S. Cl.
CPC  *F04D 3/00* (2013.01); *F16D 33/16* (2013.01); *F16H 41/30* (2013.01); *F16H 61/64* (2013.01)

(58) Field of Classification Search
CPC ......... F16H 41/30; F16H 61/64; F16D 33/06; F16D 33/16
See application file for complete search history.

(56) References Cited

U.S. PATENT DOCUMENTS 3,436,916 A * 4/1969 Becker .......................... 60/329

6,220,024 B1    4/2001 Spintzyk
(Continued)

FOREIGN PATENT DOCUMENTS

| CN | 101688570 | 3/2010 |
|---|---|---|
| DE | 197 07 172 | 10/1998 |

(Continued)

OTHER PUBLICATIONS

International Search Report dated Aug. 12, 2011 in corresponding PCT International Application No. PCT/EP2011/002697.

(Continued)

*Primary Examiner* — Michael Leslie
(74) *Attorney, Agent, or Firm* — Faegre Baker Daniels LLP

(57) ABSTRACT

The invention concerns a hydrodynamic coupling,
having a pump wheel and a turbine wheel, which form together a toroidal working chamber which can be filled with working medium;
with a closed working medium circuit, which extends from the working chamber via a working chamber outlet, an external circuit branch and a working chamber inlet back into the working chamber;
with a storage chamber positioned outside the working chamber and outside the closed working medium circuit, for receiving the working medium evacuated from the working chamber for reducing the filling level of the working chamber, which is connected via a connection for conveying the working medium outside the working chamber to the closed working medium circuit.

The invention is characterized in that the storage chamber is designed as a confined chamber which is pressure-tight to the environment, having a control pressure port so as to forcibly displace the working medium in the storage chamber with a control pressure.

20 Claims, 2 Drawing Sheets

(51) Int. Cl.
  *F16H 41/30* (2006.01)
  *F16H 61/64* (2006.01)
  *F16D 33/16* (2006.01)

(56) References Cited

U.S. PATENT DOCUMENTS

| | | | |
|---|---|---|---|
| 6,910,330 | B2 | 6/2005 | Klement et al. |
| 6,913,437 | B2 | 7/2005 | Vogelsang et al. |
| 6,928,810 | B2 | 8/2005 | Vogelsang et al. |
| 7,100,370 | B2 | 9/2006 | Klement et al. |
| 8,601,803 | B2 | 12/2013 | Hoffeld |
| 2003/0019454 | A1 | 1/2003 | Klement et al. |
| 2003/0159438 | A1 | 8/2003 | Vogelsang et al. |
| 2003/0162632 | A1 | 8/2003 | Klement et al. |

FOREIGN PATENT DOCUMENTS

| | | |
|---|---|---|
| DE | 100 46 833 | 3/2002 |
| DE | 101 63 485 | 9/2003 |
| DE | 102 31 028 | 1/2004 |
| DE | 103 28 095 | 1/2005 |
| EP | 0 204 397 | 12/1986 |
| FR | 2 331 256 | 6/1977 |
| GB | 1 424 704 | 2/1976 |
| GB | 2 172 965 | 10/1986 |
| WO | 02/18811 | 3/2002 |
| WO | 02/18812 | 3/2002 |
| WO | 02/18821 | 3/2002 |
| WO | 03/054407 | 7/2003 |
| WO | 2004/005759 | 1/2004 |

OTHER PUBLICATIONS

International Preliminary Report on Patentability dated Aug. 9, 2012 in corresponding PCT International Application No. PCT/EP2011/002697.

Office Communication dated Apr. 27, 2015 in corresponding Russian Application No. 2012157300/11.

* cited by examiner

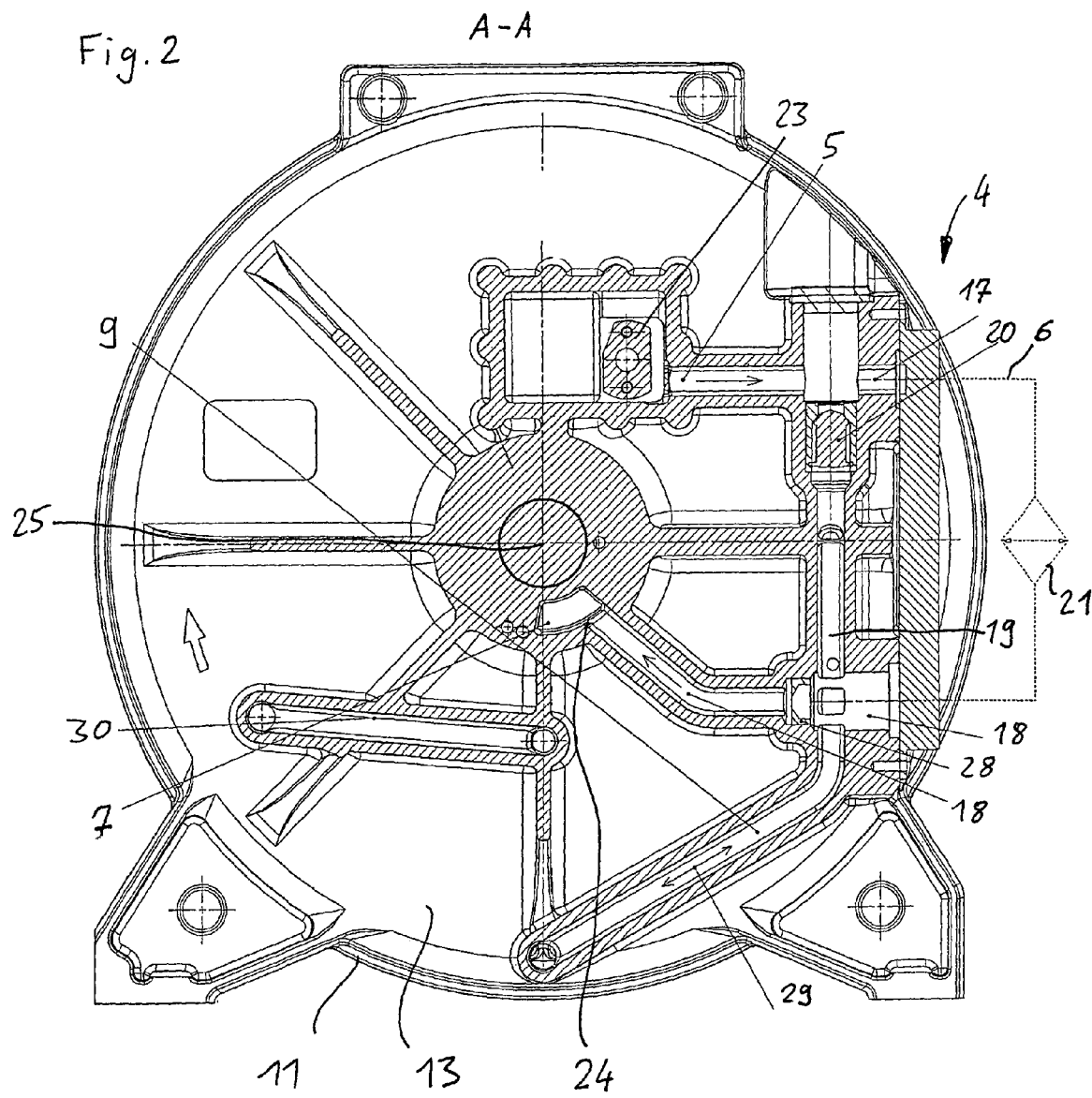

HYDRODYNAMIC COUPLING

CROSS-REFERENCE TO RELATED APPLICATION

This application is related to and claims the benefit under 35 U.S.C. §119 and 35 U.S.C. §365 of International Application No. PCT/EP2011/002697, filed Jun. 1, 2011, which claims priority to DE 10 2010 022 848.6, the disclosures of which are expressly incorporated herein by reference.

The present invention concerns a hydrodynamic coupling according to the preamble of claim 1.

Such a hydrodynamic coupling comprises, as it is described for instance in the patent specification DE 197 07 172 C1, a pump wheel and a turbine wheel, which form together a toroidal working chamber. The working chamber can be filled optionally more or less with a working medium to vary the power transmission of the hydrodynamic coupling from the pump wheel to the turbine wheel by changing the filling level of the working chamber with working medium. Such a hydrodynamic coupling is hence designated as a fill-controlled hydrodynamic coupling.

To enable variable filling of the working chamber with working medium a storage chamber is moreover provided outside the working chamber which accommodates that portion of working medium which is evacuated from the working chamber during the emptying process of said working chamber, respectively which has not been introduced into the working chamber during the filling process of the working chamber. The storage chamber could accordingly also be designated as a compensating container.

The present invention only concerns the hydrodynamic couplings, in which there is no direct connection between the storage chamber and the working chamber via which there is an exchange of working medium between both these chambers but rather in which the storage chamber is connected to an "external" closed working medium circuit via a connection for conveying the working medium. Such a closed working medium circuit guides the working medium via a working chamber outlet from the working chamber into an external circuit branch and via a working chamber inlet back into the working chamber. External does not mean necessarily that the circuit branch or the closed working medium circuit is positioned outside the hydrodynamic coupling, but rather it can also be arranged partially or completely inside the hydrodynamic coupling or inside a housing surrounding the hydrodynamic coupling. The closed working medium circuit hence is used for instance for cooling down the working medium if required or permanently, inasmuch as a heat exchanger or cooler is arranged in the external circuit branch.

Such a generic hydrodynamic coupling is, as it is described in the patent specification DE 197 07 172 C1, is conventionally controlled as regards the filling level of the working chamber, so that either a particular pump is provided for filling the coupling, by means of which the working medium is pumped from the storage chamber into the closed circuit or inasmuch a free flow of the working medium is permitted from the storage chamber into the closed circuit, in so far as the storage chamber is designed as an overhead tank, that is to say positioned above the hydrodynamic coupling so that when opening a corresponding valve in the connection for conveying the working medium between the storage chamber and the closed working medium circuit, the working medium flows by the force of gravity from the storage chamber into the closed working medium circuit and in particular supported by a lower pressure on the branch.

Practice has shown that both solutions mentioned (filling pump and overhead tank) have shortcomings Admittedly, the filling pump works reliably in any thinkable situation, however requires additional drive power and involves high constructive complexity. The overhead tank is energetically favourable since no additional drive power is required but there have been situations in practice in which the desired filling level of the working chamber of the hydrodynamic coupling could not be adjusted with the desired precision, so that the torque transmitted from the hydrodynamic coupling or the drive power transmitted from the hydrodynamic coupling does not correspond to the nominal value predefined by a torque control or a power control.

Such a deviation of the actual value of the power transmission with respect to the nominal value of the power transmission can have additional negative consequences according to the use case of the hydrodynamic coupling. If the hydrodynamic coupling, for instance as it is here possible according to an embodiment of the present invention, is used in a drive connection between a drive motor and a fan wheel to generate a cooling airflow, for cooling a device or a medium, in particular gas, the undesirable power deviation may achieve insufficient cooling efficiency and hence cause an unacceptable temperature rise.

The object of the present invention is to provide a hydrodynamic coupling which can remedy the aforementioned problem. The hydrodynamic coupling should hence work exactly, or close to, in the same energetically favourable manner as the generic coupling with a overhead tank as a storage chamber and is hence operating reliably, as the hydrodynamic coupling with a filling pump. Moreover, the complexity of construction needed should be kept minimal.

The object of the invention is solved by a hydrodynamic coupling exhibiting the features of claim 1. Advantageous and particularly appropriate embodiments of the invention are disclosed in the dependent claims.

The hydrodynamic coupling according to the invention is characterised in that the storage chamber which, as explained initially, is connected via a connection for conveying the working medium outside the working chamber on the closed working medium circuit and serves to receive the working medium coming out of the working chamber or to compensate for the working chamber flowing into the working chamber, is designed as a sealed space which is pressure-tight to the environment with a control pressure port so as to be able to introduce a control pressure into the storage chamber and thus to forcibly displace the working medium to the storage chamber.

The control pressure port can open out into the storage chamber in such a way that the control pressure medium discharged into the storage chamber via the control pressure port comes in direct contact with the working medium level. Such a working medium level separates the liquid working medium, for instance oil or water, from an air chamber or gas chamber above the working medium. To avoid any contact of the control pressure medium with the working medium, a flexible or movable restriction, for instance a diaphragm or piston, can be provided between the control pressure port and the working medium and separate the control pressure port from the working medium in a hermetically sealed manner as regarding the control pressure medium.

Air or another gas can be used as a control pressure medium. In a particular field of a use case of the hydrodynamic coupling according to the invention, it may be used for driving a fan wheel which directly or indirectly cools down a medium, in particular another gas than air, by generating a cooling airflow, and said medium can both be used as a control pressure medium.

It is advantageous if the storage chamber is designed as an annular chamber, which extends inside the hydrodynamic coupling, in particular inside a housing surrounding the hydrodynamic coupling, radially outside the working chamber of the hydrodynamic coupling around the working chamber. In particular, with such an arrangement of the storage chamber, said chamber can be designed as a stationary space and be separated by a stationary partition wall from the pump wheel and turbine wheel, to avoid any turbulence of the working medium and/or control pressure medium in the storage chamber by means of the circumferential components of the pump wheel or turbine wheel.

If the hydrodynamic coupling is enclosed by a housing, this housing can include two front sides opposite to one another which are connected to one another by a circumferential wall. In particular, the drive unit for the pump wheel is led through the first front side and in particular the power take-off of the turbine wheel is led through the second front side.

A plurality of channels guiding the working medium may be advantageously integrated in the first front side and/or the second front side and/or such channels may hence be connected to one or both front sides, which extend parallel or more or less parallel to said one or both sides. These channels guiding the working medium include at least one working medium outlet which guides the working medium from the working chamber outlet into the external circuit branch, a working medium supply, which guides the working medium from the working chamber outlet into the external circuit branch, and the connection for conveying the working medium, by means of which the storage chamber is connected to the closed working medium circuit.

In addition to the connections mentioned, advantageously a bypass is provided, connected to the or incorporated in one of both front sides, which connects the working medium outlet as regards the flow of the working medium in parallel to the connection for conveying the working medium, via which the storage chamber is connected to the closed working medium circuit to the working medium supply for conveying the working medium. The bypass can include a return valve which enables a flow of working medium exclusively in the direction of the working medium outlet to the working medium supply.

In the external circuit branch, which is positioned in particular partially or completely outside the housing of the hydrodynamic coupling, a heat exchanger for cooling the working medium is advantageously arranged.

If the hydrodynamic coupling comprises an adjoining chamber in connection with the working chamber for conveying the working medium, it is positioned advantageously axially close to the working chamber and radially inside the storage chamber. The adjoining chamber may serve to absorb the working medium flowing out of the working chamber, for instance the working medium flowing out via the separating gap between the pump wheel and the turbine wheel. The working medium can be conveyed from the adjoining chamber, in particular by means of a dynamic pressure pump back into the storage chamber. The adjoining chamber can then advantageously be designed as a non-circumferential space, so that the introduction of the mouth of a dynamic pressure pump is simplified. The adjoining chamber can also be fitted with a peeling edge to bring the working medium into the area before the mouth of the dynamic pressure pump. Other embodiments are of course also possible to convey the working medium from the adjoining chamber into the storage chamber, for instance with a pitot tube which in particular is adjustable in radial direction.

If a gas is used in particular as a control pressure medium, the working medium supply should appropriately include a widened cross-section, in particular a progressive or sudden widened cross-section, to expand the working medium on said widened cross-section, advantageously up to the atmospheric pressure. This hence enables to obtain on the one hand a reduction in speed of the working medium in the feed line, which reduces power losses and that possibly discharges the absorbed control pressure medium in the storage chamber through the working medium before entering the working chamber of the hydrodynamic coupling and/or the area of the circumferential components.

The invention will now be described by way of example using an embodiment and the figures.

The figures are as follows:

FIG. 2 shows a section along the line A-A of FIG. 1.

Figure 1:
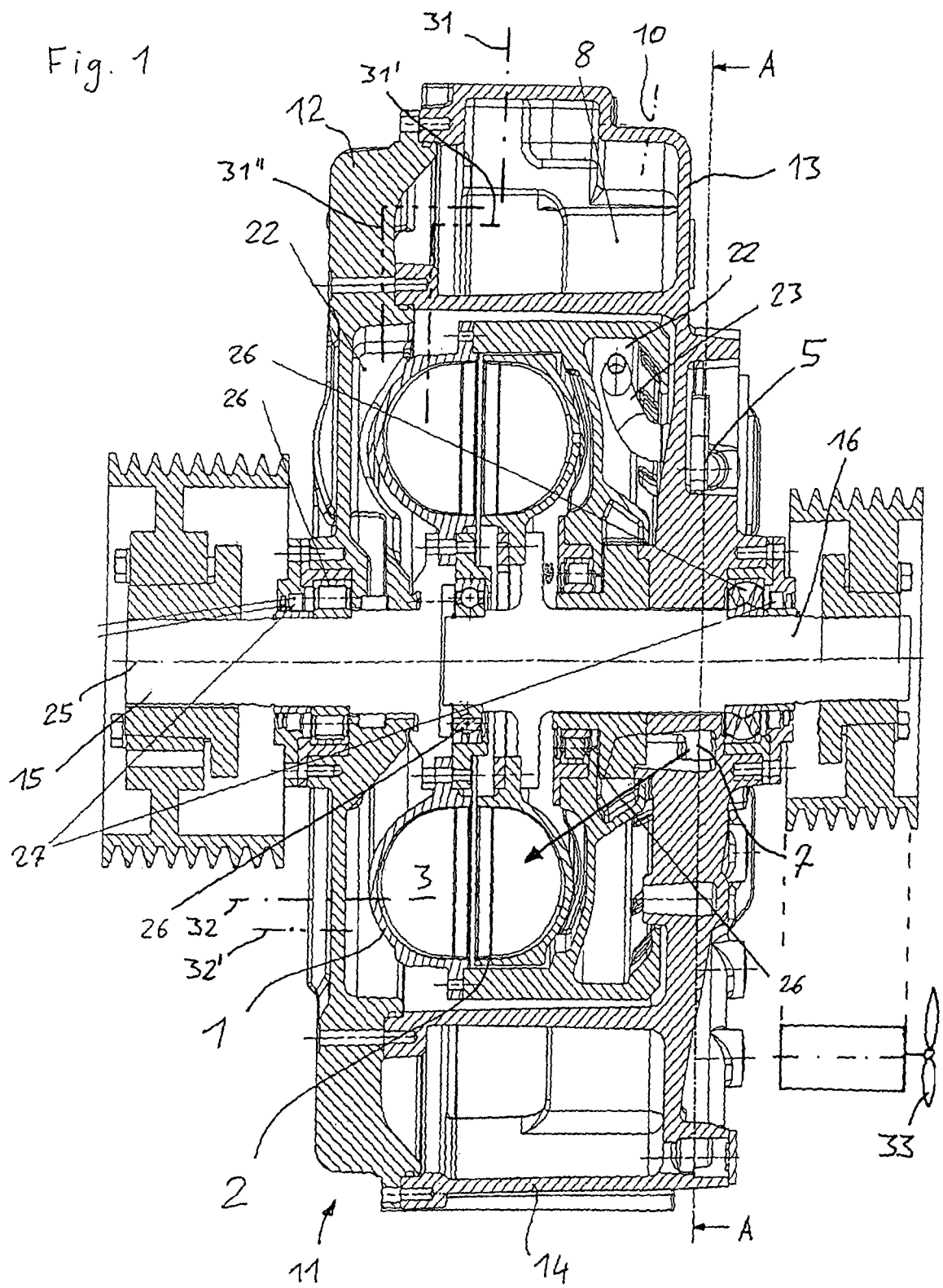
FIG. 1 shows an axial section through a hydrodynamic coupling realised according to the invention.

FIG. 1 shows an axial section through the hydrodynamic coupling, guided through the rotational axis 25 thereof. The pump wheel 1 as well as the turbine wheel 2 rotate via the rotational axis 25. The pump wheel is driven via a drive unit 15, on hand in the form of a drive shaft, which carries a belt pulley. The turbine wheel 2 drives an output 16, on hand in the form of a output shaft, which carries a belt pulley.

The pump wheel 1 and the turbine wheel 2 together build a toroidal working chamber 3, in which a hydrodynamic circular flow forms under the effect of the driving of the pump wheel 1, by means of which the drive power is transmitted from the pump wheel 1 to the turbine wheel 2. The filling level of the working chamber 3 with working medium, which forms the circular flow, is variable. A storage chamber 8 is provided for compensation purposes, which chamber is designed as a stationary chamber, whereas all the limiting walls of the storage chamber 8 do not rotate, and which encloses the working chamber 3 or the pump wheel 1 and the turbine wheel 2 in circumferential direction.

An adjoining chamber 22 provides a connection for conveying the working fluid with the working chamber 3, which adjoining chamber is in this instance more or less arranged on the same diameter as the working chamber 3 inside the hydrodynamic coupling and extends on an axial side or both axial sides of the working chamber 3. A dynamic pressure pump 23 protrudes into the adjoining chamber 22 and its mouth is opposed to the rotational direction of the pump wheel 1 and of the turbine wheel 2, so that the working medium contained in the adjoining chamber 22 is introduced into the tube of the dynamic pressure pump 23 by means of a dynamic pressure forming before the mouth.

The working medium flows out of the dynamic pressure pump 23 further to a working chamber outlet 5, which is integrated in a front side, in this instance in the second front side 13, through which the power take-off 16 is led. Power take-off 16 can drive fan wheel 33, as illustrated in FIG. 1. Accordingly, the working chamber outlet 5 is not arranged directly on the interface between the working chamber 3 and the construction space surrounding the same, but so to say in the flow direction of the working medium behind the adjoining chamber 22. One could designate the working chamber 3 together with the adjoining chamber 22 also as an extended working chamber of the hydrodynamic coupling.

The hydrodynamic coupling shown in FIG. 1 includes a housing 11 comprising the first front side 12, through which the drive unit 15 is led, the second front side 13, as well as a circumferential wall 14 connecting both front sides 12, 13. On hand, the circumferential wall 14 is designed as a single-part with the second front side 13 and the first front side 12 is screwed frontally on the circumferential wall 14.

The shaft carrying the pump wheel 1 and the shaft carrying the turbine wheel 2 are respectively journalled in two bearings 26, which advantageously are lubricated and/or cooled with said working medium. Sealing rings or gaskets 27 are provided for sealing the inside of the housing 14 on the drive shaft or the output shaft against the surrounding atmosphere. Consequently, measures, in particular in the form of expansion chambers, could be taken so that the working medium is expanded in the bearings 26 and that the gas contained therein, which is used as a control pressure medium, can be purged via the gaskets 27 to the surrounding atmosphere.

The housing 11 of the hydrodynamic coupling comprises a control pressure port 10 which opens out into the storage chamber 8 so that a control pressure medium can be introduced into the storage chamber 8 via the control pressure port 10 (or a plurality thereof) to more or less displace the working medium contained in the storage chamber 8, according to the amount of the control pressure of the control pressure medium. The displaced working medium flows via a connection 9 for conveying the working medium, which is described below with reference to FIG. 2, into the closed working medium circuit 4 (see also FIG. 2) and from there via the working chamber inlet 7 into the working chamber 3, for instance via filling holes provided between the working chamber inlet 7 and the working chamber 3.

As can be seen, the working chamber inlet 7 is positioned accordingly to the working chamber outlet 5 on the interface of the extended working chamber, that is to say in the flow direction before the adjoining chamber 22, whereas a direct connection could also be provided between the working chamber inlet 7 and the working chamber 3 bypassing the adjoining chamber 22.

FIG. 2 now clearly shows the channels guiding the working medium, which are integrated in the second front side 13, in a cut view. The elements corresponding to the illustration in FIG. 1 are indicated by the same reference signs so that any detailed explanation can be omitted. The arrow shows the rotational direction of the blade wheels (pump wheel 1 and turbine wheel 2) of the hydrodynamic coupling.

FIG. 2 shows in detail the working chamber outlet 5 in the flow direction downstream of the dynamic pressure pump 23, as well as the working chamber inlet 7. The working medium flows from the working chamber outlet 5 into the external circuit branch 6 via a working medium outlet 17, in which circuit a heat exchanger 21 for cooling the working medium is arranged. The heat exchanger 21 is normally filled with the working medium. The working medium flows from the external circuit branch 6 into the working chamber inlet 7 via a working medium supply 18. An orifice 28 is arranged in this instance in the working medium supply 18, by means of which orifice the flow of working medium can be throttled. A widened cross-section 24 of the working medium supply 18 is provided in the flow direction downstream of the orifice 28 then immediately before the working chamber inlet 7, which causes an expansion of the working medium up to the atmospheric pressure in the working chamber inlet 7 through which the gas contained in the working medium, in particular the control pressure medium is purged out of the working medium.

The pipes guiding the working medium or the channels guiding the working medium in the housing 11 hence form a closed working fluid circuit from the working chamber outlet 5, via the working medium outlet 17, the external circuit branch 6, the working medium supply 18 and the working chamber inlet 7 into the working chamber and from there again to the working chamber outlet 5.

The storage chamber 8 shown in FIG. 1 is connected to the closed working medium circuit 4 via the connection for conveying the working medium 9 illustrated as a section in FIG. 2. On hand, the connection for conveying the working medium 9 opens out in flow direction of the working medium before the orifice 28 in the closed working medium circuit 4. It is advantageous if the connection for conveying the working medium 9 is the single connection for conveying the working medium between the storage chamber 8 and the closed working medium circuit 4. In such a case, working medium flows out of the storage chamber 8 through the connection for conveying the working medium 9 into the closed working medium circuit 4 outside the working chamber 3 with an increase in pressure in the storage chamber 8 by introducing control pressure medium via the control pressure port 10, and with a corresponding reduction in pressure in the storage chamber 8, working medium flows out of the closed working medium circuit 4 outside the working chamber 3 via the connection for conveying the working medium 9 back into the storage chamber 8, see the double arrow 29. The storage chamber 8 can be vented to reduce the pressure therein either via the control pressure port 10 or at least an additional venting port or venting pipe. For example, venting pipe 31, which opens to atmosphere, venting pipe 31', which opens into working chamber 3 of the hydrodynamic coupling and venting pipe 31", which opens to adjoining chamber 22 of the hydrodynamic coupling can be used.

A bypass 19 is provided in the flow direction of the working medium parallel to the heat exchanger 21 which is also designed as a channel for guiding the working medium in the housing 11, in this instance of the second front side 13. The bypass 19 connects the working medium outlet 17 for conducting the working medium with the working medium supply 18. A return valve 20 is provided in the bypass 19 to prevent any backflow of working medium out of the working medium supply 18 into the working medium outlet 17.

A return line 30 is provided which return line is also integrated as a channel for guiding the working medium in the housing 11 or here in the second front side 13 to prevent working medium not scooped by means of the dynamic pressure pump 23 from flowing back into the working chamber 3 out of the adjoining chamber 22.

If another gas than air is used as control pressure medium, measures should appropriately be taken to reduce or to avoid any concentration of said gas in the hydrodynamic coupling. To do so, an air inlet pipe (non-represented) and an air outlet pipe 32 can be provided which cause a constant air throughput through the hydrodynamic coupling, in particular through its working chamber 3 and/or the adjoining chamber 22 to expel any incorporated gaseous control pressure medium, which for instance is a natural gas or methane gas and to avoid the formation of an ignitable mixture. For example, air outlet pipe 32, which is connected to working chamber 3 of the hydrodynamic coupling, or air outlet pipe 32', which is connected to adjoining chamber 22 of the hydrodynamic coupling can be utilized. Alternately, the oxygen-containing air can be systematically expelled from the hydrodynamic coupling by careful introduction of the control pressure medium. To do so, a venting pipe of the storage chamber is particularly advantageously connected to the hydrodynamic coupling, in particular its working chamber, so that the control pressure medium vented from the storage chamber is introduced into the hydrodynamic coupling and leaks via an air outlet pipe. If an overpressure valve, in particular a return valve or other throttle member is provided in the air outlet pipe to cause an overpressure of the vented area of the hydrodynamic coupling, no air will penetrate through a poorly sealed point or the air outlet pipe and then undesirably into the hydrodynamic coupling and the risk of formation of an ignitable mixture is reduced.

The invention claimed is:

1. A hydrodynamic coupling, comprising:
a pump wheel and a turbine wheel, which form together a toroidal working chamber which can be filled with a working medium;
a closed working medium circuit, which extends from the working chamber via a working chamber outlet, an external circuit branch and a working chamber inlet back into the working chamber;
a storage chamber positioned outside the working chamber and outside the closed working medium circuit, for receiving a quantity of the working medium evacuated from the working chamber for reducing the filling level of the working chamber, which is connected via a connection for conveying the quantity of the working medium outside the working chamber to the closed working medium circuit; wherein
the storage chamber is designed as a confined space which is pressure-tight to the surrounding atmosphere, having a control pressure port so as to forcibly displace the working medium;
wherein
the storage chamber is designed as an annular chamber, which extends inside the hydrodynamic coupling radially outside the working chamber around it.

2. The hydrodynamic coupling according to claim 1, wherein the
storage chamber comprises a stationary chamber.

3. The hydrodynamic coupling according to claim 2, wherein the hydrodynamic coupling is enclosed by a housing, comprising two front sides opposite to one another, which are connected to one another by a circumferential wall, whereas in particular the drive unit for the pump wheel is led through the first front side and in particular the output of the turbine wheel is led through the second front side, and a plurality of channels guiding the working medium are integrated in the housing, in particular on the first front face or on the second front face or they are connected thereto, comprising a working medium outlet, which guides the working medium from the working chamber outlet into the external circuit branch, a working medium supply which guides the working medium from the external circuit branch into the working chamber inlet, and the connection for conveying the working medium, by means of which the storage chamber is connected to the closed working medium circuit.

4. The hydrodynamic coupling according to claim 2, wherein the hydrodynamic coupling comprises an adjoining chamber in connection with the working chamber for conveying the working medium, the adjoining chamber which is positioned in particular axially close to the working chamber and radially inside the storage chamber, and the adjoining chamber is connected to the storage chamber for conveying the working medium, so that the working medium flowing out of the working chamber into the adjoining chamber is conveyed back into the storage chamber, in particular by means of a dynamic pressure pump, which protrudes into the adjoining chamber.

5. The hydrodynamic coupling according to claim 2, wherein the storage chamber comprises a venting pipe which opens out into the surrounding atmosphere or into the hydrodynamic coupling, in particular to the working chamber or the adjoining chamber thereof, so as to convey vented control pressure medium from the storage chamber.

6. The hydrodynamic coupling according to claim 1, wherein the hydrodynamic coupling is enclosed by a housing, comprising a first front side and a second front side opposite to one another, which are connected to one another by a circumferential wall, whereas a drive unit for the pump wheel is led through the first front side and the output of the turbine wheel is led through the second front side, and a plurality of channels guiding the working medium are one of integrated in the housing, on one of the first front side and the second front side and connected to the housing, comprising a working medium outlet, which guides the working medium from the working chamber outlet into the external circuit branch, a working medium supply, which guides the working medium from the external circuit branch into the working chamber inlet, and the connection for conveying the working medium, by means of which the storage chamber is connected to the closed working medium circuit.

7. The hydrodynamic coupling according to claim 6, wherein the plurality of channels one of integrated in the housing and connected thereto moreover comprises a bypass which connects the working medium outlet parallel to the connection for conveying the working medium, with the working medium supply for conveying the working medium, whereas a return valve is arranged in the bypass, which enables a flow of working medium exclusively in the direction of the working medium outlet to the working medium supply.

8. The hydrodynamic coupling according to claim 7, wherein a heat exchanger for cooling the working medium is arranged in the external circuit branch, which is guided in particular partially or completely outside the housing of the hydrodynamic coupling.

9. The hydrodynamic coupling according to claim 7, wherein the hydrodynamic coupling comprises an adjoining chamber in connection with the working chamber for conveying the working medium, the adjoining chamber which is positioned in particular axially close to the working chamber and radially inside the storage chamber, and the adjoining chamber is connected to the storage chamber for conveying the working medium, so that the working medium flowing out of the working chamber into the adjoining chamber is conveyed back into the storage chamber, in particular by means of a dynamic pressure pump, which protrudes into the adjoining chamber.

10. The hydrodynamic coupling according to claim 7, wherein the working medium supply includes a widened cross-section, in particular a suddenly widened cross-section, to expand the working medium, in particular to reach atmospheric pressure.

11. The hydrodynamic coupling according to claim 6, wherein a heat exchanger for cooling the working medium is arranged in the external circuit branch, which is guided one of partially and completely outside the housing of the hydrodynamic coupling.

12. The hydrodynamic coupling according to claim 11, wherein the hydrodynamic coupling comprises an adjoining chamber in connection with the working chamber for conveying the working medium, the adjoining chamber which is positioned in particular axially close to the working chamber and radially inside the storage chamber, and the adjoining chamber is connected to the storage chamber for conveying the working medium, so that the working medium flowing out of the working chamber into the adjoining chamber is conveyed back into the storage chamber, in particular by means of a dynamic pressure pump, which protrudes into the adjoining chamber.

13. The hydrodynamic coupling according to claim 11, wherein the working medium supply includes a widened cross-section, in particular a suddenly widened cross-section, to expand the working medium, in particular to reach atmospheric pressure.

14. The hydrodynamic coupling according to claim 6, wherein the working medium supply includes a widened cross-section, to expand the working medium, to reach atmospheric pressure.

15. The hydrodynamic coupling according to claim 6, wherein the hydrodynamic coupling comprises an adjoining chamber in connection with the working chamber for conveying the working medium, the adjoining chamber which is positioned in particular axially close to the working chamber and radially inside the storage chamber, and the adjoining chamber is connected to the storage chamber for conveying the working medium, so that the working medium flowing out of the working chamber into the adjoining chamber is conveyed back into the storage chamber, in particular by means of a dynamic pressure pump, which protrudes into the adjoining chamber.

16. The hydrodynamic coupling according to claim 1, wherein the hydrodynamic coupling comprises an adjoining chamber in connection with the working chamber for conveying the working medium, the adjoining chamber which is positioned axially close to the working chamber and radially inside the storage chamber, and the adjoining chamber is connected to the storage chamber for conveying the working medium, so that the working medium flowing out of the working chamber into the adjoining chamber is conveyed back into the storage chamber, by means of a dynamic pressure pump, which protrudes into the adjoining chamber.

17. The hydrodynamic coupling according to claim 16, wherein the working medium supply includes a widened cross-section, in particular a suddenly widened cross-section, to expand the working medium, in particular to reach atmospheric pressure.

18. The hydrodynamic coupling according to claim 1, wherein the storage chamber comprises a venting pipe which opens out into one of the surrounding atmosphere and the hydrodynamic coupling, so as to convey vented control pressure medium from the storage chamber.

19. The hydrodynamic coupling according to claim 18, wherein the venting pipe opens out into the hydrodynamic coupling, and an air outlet pipe is connected to the hydrodynamic coupling, with one of an overpressure valve and a throttle member via which the control pressure medium vented from the storage chamber by maintaining an overpressure in the vented area of the of the hydrodynamic coupling is discharged to the surrounding atmosphere.

20. A method for using a hydrodynamic coupling, comprising:
  driving a fan wheel with the hydrodynamic coupling, which one of the directly and indirectly cools down a first medium, by generating a cooling airflow, the hydrodynamic coupling comprising:
  a pump wheel and a turbine wheel, which form together a toroidal working chamber which can be filled with working medium;
  a closed working medium circuit, which extends from the working chamber via a working chamber outlet, an external circuit branch and a working chamber inlet back into the working chamber;
  a storage chamber positioned outside the working chamber and outside the closed working medium circuit, for receiving a quantity of the working medium evacuated from the working chamber for reducing the filling level of the working chamber, which is connected via a connection for conveying the working medium outside the working chamber to the closed working medium circuit; wherein
  the storage chamber is designed as a confined space which is pressure-tight to the environment, having a control pressure port so as to forcibly displace the working medium in the storage chamber with a control pressure;
  the method further comprising:
  using the first medium at the same time as a control medium of the hydrodynamic coupling.

* * * * *